United States Patent
Loghman et al.

(10) Patent No.: US 9,754,377 B2
(45) Date of Patent: Sep. 5, 2017

(54) MULTI-RESOLUTION DEPTH ESTIMATION USING MODIFIED CENSUS TRANSFORM FOR ADVANCED DRIVER ASSISTANCE SYSTEMS

(71) Applicants: Maziar Loghman, Chicago, IL (US); Maral Mesmakhosroshahi, Oak Park, IL (US); Joohee Kim, Oak Brook, IL (US)

(72) Inventors: Maziar Loghman, Chicago, IL (US); Maral Mesmakhosroshahi, Oak Park, IL (US); Joohee Kim, Oak Brook, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 14/827,897

(22) Filed: Aug. 17, 2015

(65) Prior Publication Data
US 2016/0048970 A1    Feb. 18, 2016

Related U.S. Application Data

(60) Provisional application No. 62/037,987, filed on Aug. 15, 2014.

(51) Int. Cl.
| | |
|---|---|
| *G06K 9/00* | (2006.01) |
| *G06T 7/00* | (2017.01) |
| *G06T 5/00* | (2006.01) |
| *G06T 7/593* | (2017.01) |
| *H04N 13/00* | (2006.01) |

(52) U.S. Cl.
CPC ............ *G06T 7/0075* (2013.01); *G06T 5/005* (2013.01); *G06T 7/593* (2017.01); *G06T 2207/10012* (2013.01); *G06T 2207/10028* (2013.01); *G06T 2207/20028* (2013.01); *G06T 2207/20192* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 6,215,898 B1 * | 4/2001 | Woodfill | G06K 9/32 |
| | | | 348/47 |
| 8,467,596 B2 * | 6/2013 | Abadpour | G06T 7/12 |
| | | | 348/135 |

(Continued)

OTHER PUBLICATIONS

Binary stereo matching, Zhang et al., ICPR 2012, pp. 356-359.*

(Continued)

*Primary Examiner* — Jayesh A Patel
(74) *Attorney, Agent, or Firm* — Pauley Erickson & Rottis

(57) ABSTRACT

A computer-implemented depth estimation method based on non-parametric Census transform with adaptive window patterns and semi-global optimization. A modified cross-based cost aggregation technique adaptively creates the shape of the cross for each pixel distinctly. In addition, a depth refinement algorithm fills holes within the estimated depth map using the surrounding background depth pixels and sharpens the object boundaries by exerting a trilateral filter to the generated depth map. The trilateral filter uses the curvature of pixels as well as texture and depth information to sharpen the edges.

20 Claims, 5 Drawing Sheets

(56) References Cited

U.S. PATENT DOCUMENTS

| | | | | |
|---|---|---|---|---|
| 2006/0067583 A1* | 3/2006 | Mushano | ............... | H04N 19/30 |
| | | | | 382/239 |
| 2012/0327189 A1* | 12/2012 | Muramatsu | .............. | G01C 3/06 |
| | | | | 348/46 |
| 2013/0033582 A1* | 2/2013 | Sun | .................... | H04N 13/0018 |
| | | | | 348/47 |
| 2013/0077852 A1* | 3/2013 | Chang | ................... | G06T 7/0075 |
| | | | | 382/154 |

OTHER PUBLICATIONS

SGM-based—adaptive Census transform, Longman et al., IEEE, 978-1-4799-2491-2, 2013, pp. 592-597.*

Loghman, M., et al., "SGM-based dense dispartiy estimation using adaptive Census transform," IEEE Int'l Conf. on Connected Vehicles and Expo (CCVE), Dec. 2-6, 2013, pp. 592-597.

Vijayanagar, K.R., et al., "Refinement of Depth Maps Generated by Low-Cost Depth Sensors," IEEE Int'l SoC Design Conference (ISOCC), Nov. 4-7, 2012, pp. 355-358.

Vijayanagar, K.R., et al., "Real-Time Refinement of Kinect Depth Maps using Multi-Resolution Anisotropic Diffusion," Movile Netw Appl, Sep. 2014, V. 19, pp. 414-425.

* cited by examiner

Algorithm 1 Look-Up Table Generation $j \leftarrow 1$
for $i = 1 \rightarrow 255$ do
   if $i == d_j$ and $j \neq N - 1$
then
      $j \leftarrow j + 1$
   end if
   depthLUT $(i) \leftarrow d_j$
end for

MULTI-RESOLUTION DEPTH ESTIMATION USING MODIFIED CENSUS TRANSFORM FOR ADVANCED DRIVER ASSISTANCE SYSTEMS

CROSS REFERENCE TO RELATED APPLICATION

This application claims the benefit of U.S. Provisional Patent Application Ser. No. 62/037,987, filed on 15 Aug. 2014. The co-pending Provisional Application is hereby incorporated by reference herein in its entirety and is made a part hereof, including but not limited to those portions which specifically appear hereinafter.

BACKGROUND OF THE INVENTION

This invention relates generally to determining or providing depth in or for three-dimensional images (3D) and, more particularly, to depth estimation for computer vision applications such as 3D scene reconstruction and/or stereo-based object detection.

Depth is considered as one of the most important cues in perceiving the three dimensional characteristics of objects in a scene captured by cameras. In computer vision, the value which represents the distance between each object in the scene to the focal point of the camera is called depth and an image storing these values for all the pixels is referred to as a depth map. Depth maps are essential in a variety of applications such as view synthesis, robot vision, 3D scene reconstruction, interactions between humans and computers, and advanced driver assistance systems. The performance of these mentioned applications is highly dependent on the quality and accuracy of the depth map. Thus, generating an accurate depth map is of substantial importance. The main objective of depth estimation methods is to generate a per-pixel depth map of a scene based on two or more reference images. The reference images are captured by a stereo camera system in which the cameras are parallel to each other or are set with a slight angle.

Depth maps can be estimated by using either stereo matching techniques or depth sensors. With the advent of depth sensors, fusion camera systems have been developed which directly measure the depth in real-time. The measurement of depth in such sensors is usually performed by either using time-of-flight (TOF) systems or infrared pattern deformation. Depth maps acquired by the depth sensors are usually noisy and suffer from poorly generated depth boundaries.

Over the past several years, stereo-based methods which estimate the depth map algorithmically have attracted a lot of attention in the research community. Computation of the shift between the two reference images, also known as disparity, is a main key to determine the depth values in stereo matching techniques.

The stereo matching techniques can be classified into two groups, namely local and global techniques. The local methods generally consider a finite neighboring window to estimate the disparity. Thus, the window size plays an important role in such methods. The local methods are fast and computationally simple but, they are highly error-prone and the estimated depth maps are usually inaccurate. On the other hand, in global techniques an energy function is globally optimized to find the disparity. Global depth estimation techniques can generate high-quality depth maps. Most popular techniques in this category include belief propagation, graph cuts and dynamic programming. However, due to the computational complexity of such algorithms, it is not feasible to exploit them in real-time applications. Combining the concepts of local and global stereo matching methods was first introduced as semi-global matching (SGM). SGM performs pixel-wise matching based on mutual information and the approximation of a global smoothness constraint and a good trade-off between accuracy and runtime is obtained. However, it achieves limited performance under illumination changes. Despite the advantages of different depth estimation techniques, there are several problems in the generated depth maps. The existence of holes and sensitivity to noise and illumination changes are the main significant problems.

Thus there is a continuing need for improved depth estimation techniques.

SUMMARY OF THE INVENTION

A general object of the invention is to provide an improved method for depth estimation. Some embodiments of the depth estimation method of this invention are based on the non-parametric Census transform and semi-global optimization. The method of this invention improves the quality of estimated depth maps to fulfill the demands of real-time applications such as 3D scene reconstruction and/or stereo-based pedestrian detection.

The method according to some embodiments of this invention can be described as a multi-resolution census-based depth estimation scheme that performs novel depth refinement techniques to enhance the quality of the output. The method comprises three major steps: cost calculation, optimization, and refinement.

The general object of the invention can be attained, at least in part, through a method, implemented by a computer system, of determining depth in images. The method includes: generating an image mask indicating smooth areas and object edges for each of a pair of stereo images; calculating a computation cost for a plurality of pixels within the image mask, such as by using Census transform to map a pixel block into a bit stream; and matching pixels between the pair of stereo images and optimizing a value for the matching pixels to obtain an estimated depth map. In embodiments of this invention, to generate the image mask, the image resolution is first reduced for each of the pair of stereo images.

The invention further includes a method of determining depth in images including: reducing image resolution in each of a pair of stereo images; creating an image mask as a function of pixel curvatures for each of the pair of stereo images, such as by distinguishing between the smooth areas and the object edges as a function of pixel curvature; determining a computational cost value for a plurality of pixels using a Census transform to map a local neighborhood surrounding each of the plurality of pixels to a bit stream; aggregating cost values for each of the plurality of pixels; and matching pixels between the pair of stereo images and optimizing a value for the matching pixels to obtain an estimated depth map.

The proposed depth estimation technique according to some embodiments of this invention exploits the non-parametric Census transform to calculate the cost function. The non-parametric Census transform maps the surrounding block of a pixel into a bit string. A simple Census window pattern is used for the smooth regions which leads to less computation, and a more complex pattern is applied to the non-uniform regions which usually occur along the edges and object boundaries.

Compared to the existing hole filling techniques, the depth refinement algorithm according to some embodiments of this invention only considers the background pixels to fill the holes. The curvatures of pixels are considered and a trilateral filter enhances the quality of the estimated depth map. In order to avoid generating new depth values, the algorithm can map them to the nearest existing depth value.

By considering the boundary pixels in the vicinity of a hole region which have non-zero depth values, the method chooses the ones that belong to the background by comparing the depth values. The holes are then filled by a weighted interpolation on the selected correct pixels. The weights are calculated using Gaussian distribution based on the distance to the current pixel. Therefore, the farther pixels would have less impact on the calculated depth value. The quality of the hole filled depth map is improved by applying the trilateral filter which makes the boundaries sharper and corrects the misaligned regions. The proposed filter comprises three terms: depth data, texture data, and the curvature. The method also desirably ensures that no new depth values are introduced during the up-sampling. Therefore, when the depth map is filtered using the trilateral filter, the new depth values are adjusted by mapping them to the nearest depth value which already exists in the depth map.

The method and system of this invention are desirably automatically executed or implemented on and/or through a computing platform. Such computing platforms generally include one or more processors for executing the method steps stored as coded software instructions, at least one recordable medium for storing the software and/or video data received or produced by method, an input/output (I/O) device, and a network interface capable of connecting either directly or indirectly to a video camera and/or the Internet or other network.

Other objects and advantages will be apparent to those skilled in the art from the following detailed description taken in conjunction with the appended claims and drawings.

DETAILED DESCRIPTION OF THE INVENTION

The present invention provides a method for generating a depth map from a stereo image pair. Generating an accurate depth map is a vital factor in many applications. In some embodiments of this invention, a novel depth estimation and refinement method is proposed. The depth estimation method is a multi-resolution census-based technique which benefits from a semi-global optimization technique. In contrast to the original semi-global matching algorithm, a Census transform is used that is robust against illumination changes. Therefore, the algorithm is applicable under different illumination situations. The proposed algorithm is performed in a multi-resolution basis in order to achieve higher frame rates. The pixel gradients are used to distinguish between smooth and complex parts of the image and based on different regions, and the cost calculation is performed separately.

Figure 1:
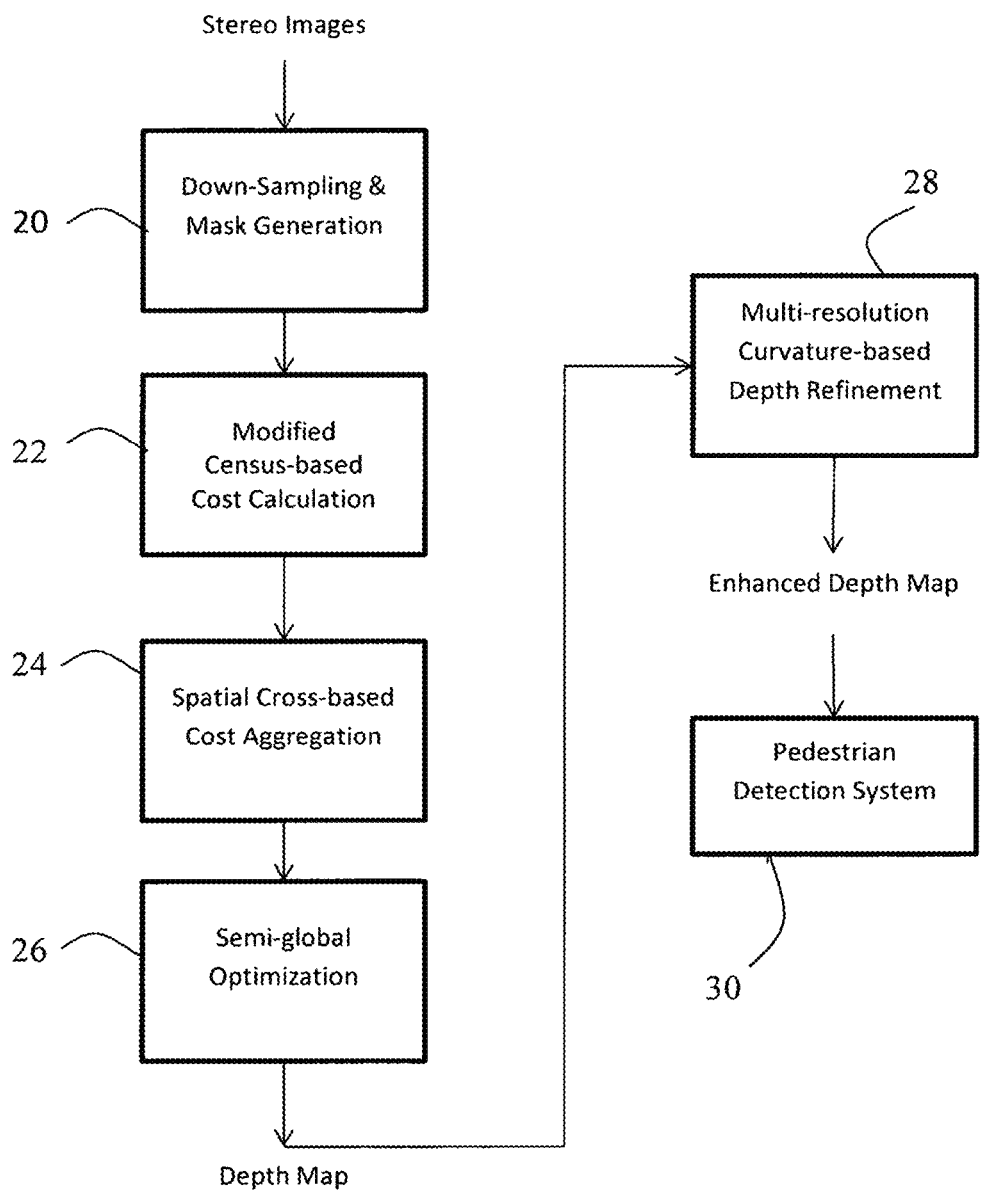
FIG. 1 is a block diagram of a method according to one embodiment of this invention.

FIG. 1 is a block diagram of a method according to embodiments of this invention. As shown in FIG. 1, a stereo image pair is used as the reference to generate a depth map. In embodiments of this invention, the method includes steps of: down-sampling and mask generation, cost calculation and aggregation, semi-global optimization, and depth refinement.

Step 20 includes down-sampling and mask generation. In an ideal case, pixels belonging to the same object should have the same depth value. However, this is not always the case, due to erroneous mismatches, change of illumination, etc. In embodiments of this invention, the curvatures of the pixels in the given color images are used to distinguish between the smooth area and sharp edges of the objects in the scene. In order to reduce computational complexity of the algorithm, a first step is to down-sample the stereo color images by a predetermined factor. Both left and right images of the stereo image pair are down-sampled. In one embodiment, the images' resolution is reduced to ¼ of the original image size. For every 4×4 window, only one pixel is used, which is desirably the average of all 16 pixels.

Figure 2:
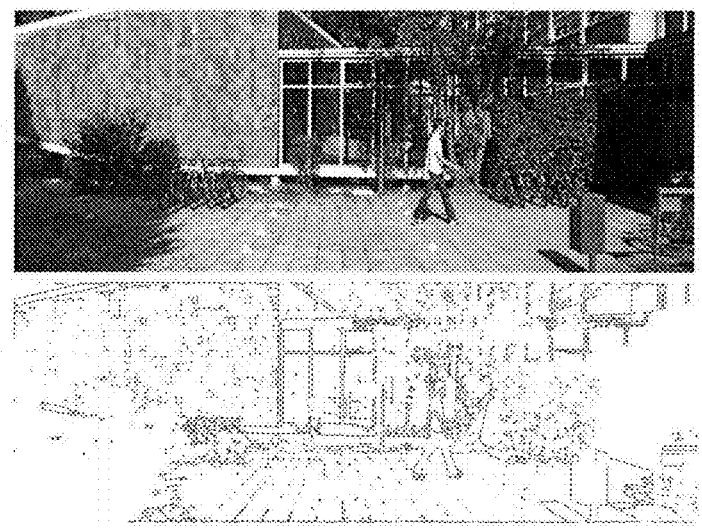
FIG. 2 shows an image and a generated mask, according to one embodiment of this invention.

A mask is then obtained, such as shown in FIG. 2, which indicates the smoothness of different regions in the reference image. In embodiments of this invention, the curvatures of the pixels in the reference image pair are used to create the mask. Curvature can be used to distinguish between the smooth area and sharp edges of the objects in the scene.

In embodiments of this invention, the curvature is calculated using the first and second order gradients of each pixel, given by:

$$k = \frac{u_{xx}u_x^2 - 2u_x u_{xy} u_y + u_{yy} u_y^2}{(u_x^2 + u_y^2)^{3/2}}, \quad (1)$$

where $u_x$ and $u_{xx}$ are the first and second order gradients, respectively. Subscripts indicate the direction of gradient. The Prewitt kernel is used to find the gradient. After computing the curvature, the values are aggregated over a 5×5 window and stored in a curvature map. A binary mask is generated by Equations (2) using the curvature map.

$$M(x, y) = \begin{cases} 0, & \text{if } curv_{agg}(x, y) \leq T_1 \\ 1 & \text{esle} \end{cases}, \quad (2)$$

$$curv_{agg}(x, y) = \sum_{5 \times 5} curv(x, y).$$

In Equations (2), M(x, y) is the mask value at location (x, y). The summation of curvature values over a 5×5 window is referred to as curv$_{agg}$. $T_1$ is the mean value of the curvature map. When the aggregated curvature of a pixel is less than a threshold, a zero value is assigned to the mask. An example of mask generation from a color image is shown in FIG. 2.

Step 22 of FIG. 1 includes the calculation of a computation cost for a plurality of pixels within the image mask. The similarity of image locations are measured by defining a matching cost. Normally, a matching cost is calculated at each pixel for all disparities under certain considerations.

Figure 3:
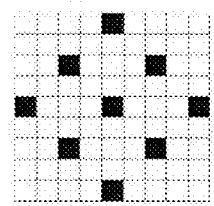
FIG. 3 is a census window pattern P1 for uniform regions, according to one embodiment of this invention.
Figure 4:
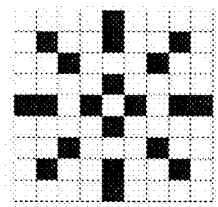
FIG. 4 is a census window patterns P2 for non-uniform regions, according to one embodiment of this invention.

In embodiments of this invention, a computational cost value for pixels is determined using a Census transform to map a local neighborhood surrounding each of the plurality of pixels to a bit stream. The Census transform is calculated for both left and right images. In embodiments of this invention, a simple Census window pattern is used for the smooth regions to reduce the computational complexity and a more complex pattern is used for the non-uniform regions which usually contain edges and object boundaries. Adaptive Census window patterns according to one embodiment of this invention are shown in FIG. 3 (8 pixels) and FIG. 4 (20 pixels), where the selected positions are denoted by black pixels.

For the pixel $I_c(x,y)$, the Census transform is calculated using:

$$R_T(x,y) = \bigotimes_{x \in N} \xi(I_c(x_1,y_1), I_c(x_2,y_2)), \quad (3)$$

where N is the neighborhood of the current pixel within the Census transform, $\xi$ is the step function, and $\otimes$ is bit-wise concatenation. The step function is defined by:

$$\xi(I_c(x_1, y_1), I_c(x_2, y_2)) = \begin{cases} 0, & I_c(x_1, y_1) \leq I_c(x_2, y_2) \\ 1, & \text{else} \end{cases}. \quad (4)$$

The binary mask generated in the previous step is used to decide which pattern to use. If the number of mask pixels in the neighborhood of the reference pixel $\alpha$ is less than a predefined threshold $T_2$, the first pattern is used. The decision criterion is made as follows.

$$\text{Pattern} = \begin{cases} P_1 & \text{if } \alpha \leq T_2 \\ P_2 & \text{else} \end{cases}, \quad (5)$$

$$\alpha = \sum_{(i,j) \in N} M(x+i, y+j)$$

The cost function is calculated by finding the Hamming distance between the obtained bit streams of the left and right reference images using:

$$C((x,y),d) = d_H(BS_l(x_i,y_i), BS_r(x_i,y_i)), \quad (6)$$

where BS is the calculated bit stream, d is the disparity, $d_H$ is the Hamming distance function, and the subscripts l and r refer to the left and right reference images, respectively.

Since the cost is calculated for each pixel, each pixel's cost over a support region is aggregated in step 24 of FIG. 1. The main goal of cost aggregation is to reduce the matching ambiguities and noise present in the initial cost. In embodiments of this invention, a modified cross-based cost aggregation is used based upon the effective assumption that neighboring pixels with similar colors and spatial characteristics usually belong to the same object and should have similar depth values.

Figure 5:
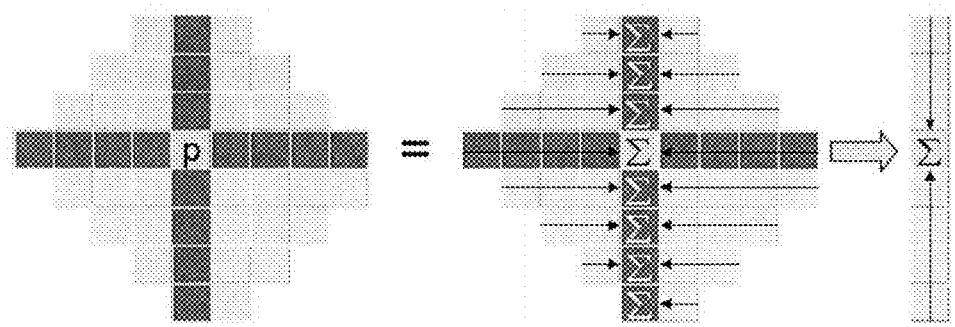
FIG. 5 illustrates cost aggregation according to one embodiment of this invention.

In embodiments of this invention, the proposed cost aggregation method includes: creating a cross shape, and aggregating cost over the created cross. FIG. 5 illustrates this cost aggregation. For the first step, an adaptive cross is constructed for each pixel. The arm length of the cross varies for different pixels based on some criterion. Given a pixel p, the endpoint of the arm is defined as p1 when one of the three following rules is not met: (1) the color difference between p and p1 should be less than a predefined threshold; (2) the spatial distance between p and p1 should be less than a preset maximum length; or (3) the curvature values of p and p1 in the curvature map should not exceed a threshold. The abovementioned criteria are defined by:

$$|I_c(p) - I_c(p_1)| \leq \tau_1,$$

$$|d_E(p) - d_E(p_1)| \leq L,$$

$$|\text{curv}(p) - \text{curv}(p_1)| < \tau_2 \quad (7)$$

where $d_E$ is the Euclidean distance, L is the maximum length, and $\tau_1$ and $\tau_2$ are predefined thresholds. The thresholds have the main impact on the shape of the cross. Large thresholds are usually set for textureless regions in order to include adequate intensity variation.

The next step is aggregating the cost values over the created cross. The intermediate cost is obtained by summing the cost values horizontally and the final cost is calculated by adding all the intermediate data vertically. The process is illustrated by FIG. 5.

After finding the final cost, the method includes, in step 26 of FIG. 1, matching pixels between the pair of stereo images and optimizing a value for the matching pixels to obtain an estimated depth map. The best match for each pixel is obtained and the disparity between the matches is calculated. The optimum disparity is calculated by minimizing the energy function. As shown in Equation (8), the energy function consists of three terms. The first term is the matching cost from the previous step which is based on the Census transform. The other two terms are smoothness energy terms. In one embodiment of this invention, two penalty terms are added to the matching cost function to take into account slight and abrupt changes in the disparity of neighboring pixels. An 8-direction optimization path is used to reach the optimum value.

$$E(d) = \Sigma C(p, d_p) + \Sigma P_1 F[|d_q - d_p| = 1] + \Sigma P_2 F[|d_q - d_p| \neq 1], \quad (8)$$

where $d_p$ and $d_q$ are the depth values for pixels p and q. The problem can be illustrated as finding the disparity which minimizes the energy function obtained in the previous step.

The pixels can be converted to depth values once the disparity for all the pixels is obtained. The focus step 28 in FIG. 1 is the refinement of the estimated depth map and this is broken down into two major steps: (1) filling the holes in the estimated depth map, and (2) sharpening the edges and object boundaries.

The estimated depth map from the previous steps has some black regions due to the occlusion and mismatches which need to be filled. These hole regions usually belong to the background which cannot be seen from the other reference view. Hence the algorithm fails to estimate a depth value for those specific regions. By considering the boundary pixels in the vicinity of the hole region which have non-zero depth values, the ones that belong to the background can be solely chosen by comparing the depth values.

The holes are then filled by a weighted interpolation on the selected correct pixels using:

$$d_{hole} = \frac{\sum_{i=1}^{N} w_i d_i^{bg}}{\sum_{i=1}^{N} w_i} \quad (9)$$

where $d^{bg}$ is the background depth value and w is the weighting factor based on the distance from the background depth pixel to the current hole.

The weights are calculated using Gaussian distribution based on the distance to the current pixel using Equation (11). Therefore, the farther pixels would have less impact on the calculated depth value.

At this stage of the algorithm, there is a low resolution dense disparity image which needs to be up-sampled to the original size. In embodiments of this invention, the up-sampling is performed by applying a trilateral filter which makes the boundaries sharper and corrects the misaligned regions using Equation (10). The designed filter consists of three terms: depth data, texture data, and the curvature.

$$d(p) = \frac{1}{w}\sum d(q) f_{dep}(\|d_p - d_q\|) f_{tex}(\|C_p - C_q\|) f_{curv}(\|k_p - k_q\|), \quad (10)$$

In Equation (1), d is the disparity value, C and k are the color and curvature values, respectively, and f is the Gaussian distribution with standard deviation σ defined by Equation (11).

$$f(x) = e^{-(\|x\|/\sigma)^2}. \quad (11)$$

To ensure that no new depth values are introduced during the up-sampling, when the depth map is filtered using the trilateral filter, the new depth values can be adjusted by mapping them to the nearest depth value which already exists in the depth map. To accomplish this using a high-level programming language, if-else conditional statements have to be used to decide the candidate for depth value while filtering using:

$$d_k = \begin{cases} d_{i-1}, & \text{if } d_k \leq d_{i-1} \\ d_i & \text{esle} \end{cases} \quad (12)$$

Figures 6, 7:
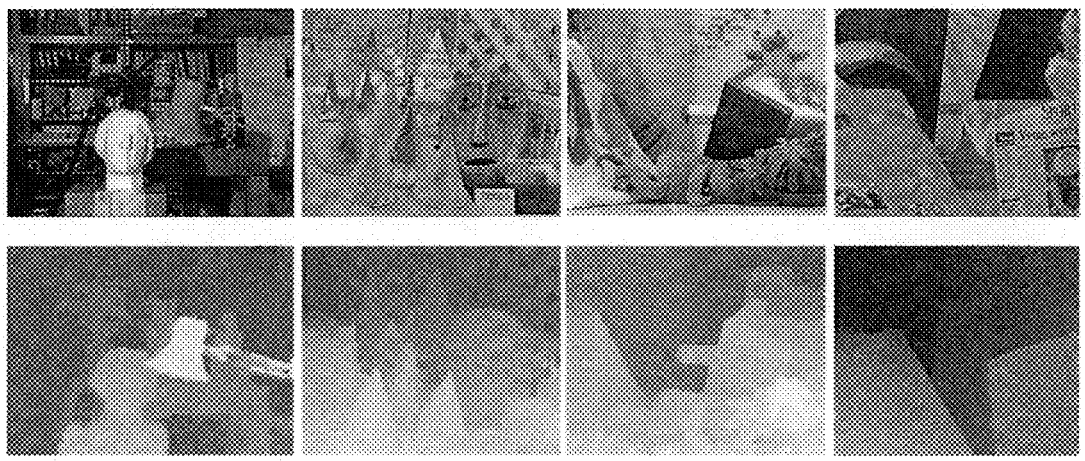
FIG. 6 is an algorithm according to one embodiment of this invention.
FIG. 7 shows images and the corresponding depth maps generated by the invention.

In case of N distinct depth values, the N−1 conditions need to be checked, which will increase the run-time of the algorithm if this is performed for all the pixels. The Look-Up Table (LUT) as shown in FIG. 6 is an optimization according to one embodiment of this invention that maps each value in the range of 0-255 to a unique depth value. As shown in FIG. 1, the resulting enhanced depth map is sent in step 30 for further processing in video-based pedestrian detection systems, and/or other three-dimensional video applications.

In some embodiments according to this invention, the depth map estimation method performs stereo matching without explicit image rectification. In one embodiment of the invention, the fundamental matrix is estimated by using Random Sample Consensus and an 8-point algorithm. Then, an epipolar line equation obtained by projective mapping is derived and the search for point correspondence is performed along the epipolar line. Simulation results show that the method produces accurate depth maps for uncalibrated stereo images with reduced computational complexity.

Most stereo matching algorithms make assumptions about camera calibration and epipolar geometry. In these approaches, given a pair of stereo images, image rectification is performed so that pairs of conjugate epipolar lines become collinear and parallel to the x-axis of image. One major advantage of rectification is that point correspondence becomes much simpler because the search is performed along the horizontal lines of the rectified images. However, image rectification is computationally expensive and sometimes causes undesirable distortions. In embodiments of this invention, a depth map estimation algorithm performs stereo correspondence without explicit image rectification.

In embodiments of this invention, the method computes disparities in pair of non-rectified images without explicit image rectification. A Radom Sample Consensus (RANSAC) algorithm (M. A. Fischler et al., "Random sample consensus: a paradigm for model fitting with applications to image analysis and automated cartography," *Communications of the ACM*, vol. 24 (6), pp 381-395, June 1981) is used to calculate a fundamental matrix and the Census transform is used as the matching criterion to obtain disparities. The method includes three steps: estimating the fundamental matrix, updating epipolar search lines, and computing disparities.

The fundamental matrix is the algebraic representation of epipolar geometry. Given a pair of stereo images, to each point in one image, there exists a corresponding epipolar line in the other image. Any point in the second image matching the point in the first image must line on the epipolar line and a projective mapping from a point in one image to its corresponding epipolar line in the other image is represented by the fundamental matrix. For robust estimation of the fundamental matrix, RANSAC was used to remove the effect of outliers and apply an 8-point algorithm. To improve the accuracy in estimating the fundamental matrix, matching points that have larger Euclidean distance were chosen. This modification can increase the probability that the coplanar matching points which lie on the same object are not chosen to estimate the fundamental matrix.

Based on the relation between the epipolar line and the fundamental matrix, a line equation is computed. In some embodiments of the method, the epipolar line is used as the search line. The rectification step can be bypassed, which is time consuming and in many cases causes shearing and resampling effect. While calculating the line equation for each pixel, an implementation optimization is applied which can reduce the computational complexity in an M×N image from 9MN multiplications plus 6MN additions to only 3(M+N) additions. The epipolar line equation $l_r$ can be written as:

$$l_r: c_1 x + c_2 y + c_3 = 0, \quad (13)$$

where $c_1$, $c_2$ and $c_3$ are the line equation coefficients for the pixel (x,y). The right side image epipolar line coefficients vector can be written as:

$$\begin{bmatrix} c_1 \\ c_2 \\ c_3 \end{bmatrix} = \begin{bmatrix} f_{11} \\ f_{21} \\ f_{31} \end{bmatrix} \times x_l + \begin{bmatrix} f_{12} \\ f_{22} \\ f_{32} \end{bmatrix} \times y_l + \begin{bmatrix} f_{13} \\ f_{23} \\ f_{33} \end{bmatrix}, \quad (14)$$

where $x_l$ and $y_l$ refer to the column and row coordinate of the left side image point, respectively. Starting with the (0,0) coordinate in the left side image, the right image epipolar line coefficients vector can be initialized by the third column vector of the fundamental matrix. To reduce the computational complexity significantly, only an addition of the second column vector of the fundamental matrix can be considered while switching from the corresponding epipolar lines of two consecutive points. Stepping from one row to the next one, a single vector addition of the fundamental matrix first column vector and the epipolar line coefficients are applied.

For a pixel in the left side image, the start point of the searching strategy is the projection of the pixel in the same coordinate in the right side image onto the epipolar line. This point has the least distance to the reference pixel compared to the other points on the line. The maximum disparity range is defined by the user and varies based on the image resolution. The search direction is on the epipolar line. The matching metric used for cost calculation is the non-parametric Census transform due to its robustness to illumination changes. Census transform maps a block surrounding the reference pixel into a bit string. The cost function is calculated by finding the Hamming distance of the obtained bit streams. The final matching cost function is used for optimization. The optimum disparity is the value which minimizes the cost function.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Simulations were performed to show the efficiency of the method compared with those of the state-of-the-art SGM-based stereo matching methods. The performance of the depth estimation and refinement algorithms of this invention were evaluated against the Middlebury data (D. Scharstein et al. "High-accuracy stereo depth maps using structured light," *Proc of IEEE Conf on Computer Vision and Pattern Recognition (CVPR)*, vol. 1, pp. 195-202, June 2003), and the KITTI stereovision benchmark suite (A. Geiger et al., "Are we ready for Autonomous Driving? The KITTI Vision Benchmark Suite," *Proc. of IEEE Conf on Computer Vision and Pattern Recognition (CVPR)*, pp. 3354-3361, June 2012). The workstation runs the Windows 7 operating system with Intel Xeon Quad-Core processor and 8 GB RAM. Four different image pairs from the Middlebury dataset are chosen for the evaluation. FIG. 5 shows results of depth estimation by the proposed technique.

Table I indicates the error statistic of percentage of bad pixels with respect to the provided ground truth depth map. The percentage of bad pixels evaluation criterion is defined by:

$$P_{bp} = \frac{1}{N} \sum (\text{abs}(d_G(x, y) - d_{GT}(x, y)) \geq \delta), \quad (15)$$

where $d_G$ and $d_{GT}$ are the generated and ground truth depth values, respectively, $\delta$ is the error tolerance, and N is the total number of pixels of the image.

TABLE I

Percentage of bad pixels for the Middlebury Dataset

| Stereo image | Invention method | SGM |
|---|---|---|
| Tsukuba | 2.40% | 3.96% |
| Cones | 7.73% | 9.75% |
| Teddy | 11.75% | 12.2% |
| Venus | 0.82% | 1.57% |

Table II shows the processing time of the proposed algorithm by running in the Middlebury dataset using C programming on CPU.

TABLE II

Computational Time Complexity

| Stereo image | Size (pixels) | Time(ms) |
|---|---|---|
| Tsukuba | 384 × 288 | 57 |
| Cones | 450 × 375 | 64 |
| Teddy | 450 × 375 | 68 |
| Venus | 434 × 383 | 59 |

Figure 8:
FIG. 8 shows a color image, the corresponding estimated depth map, and a refined depth map.

The proposed algorithm has been tested on the KITTI dataset, which consists of 194 training image pairs and 195 test image pairs. The images have 1224×370 pixels resolution. FIG. 8 shows the result of depth estimation and refinement for a sample left side image of KITTI dataset.

Figure 9:
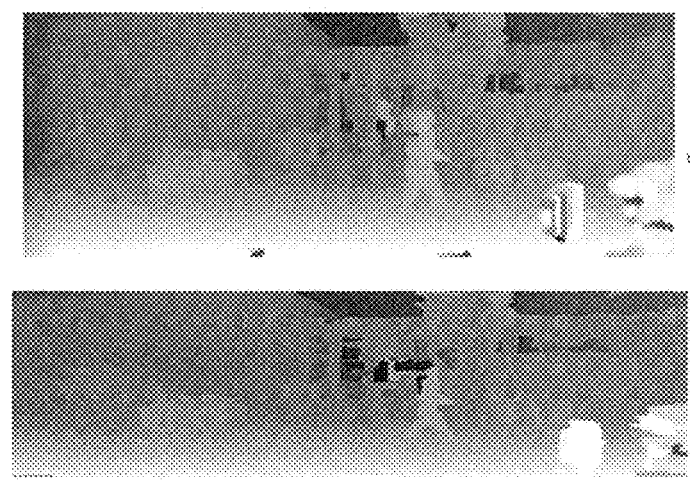
FIG. 9 illustrates a hole filling comparison of filling all the surrounding correct pixels, and filling only considering background depth pixels.

As stated earlier, the proposed depth refinement algorithm uses neighboring background pixels solely to fill the holes and also incorporates a depth adjustment stage to ensure that no new depth values are replaced a correct depth value in the depth map. FIG. 9 compares the result of hole filling where in FIG. 9(b) only the background depth pixels are used. FIG. 9 only shows the hole filling result without applying edge sharpening. The final result of depth refinement is shown in FIG. 8(c).

Figure 10:
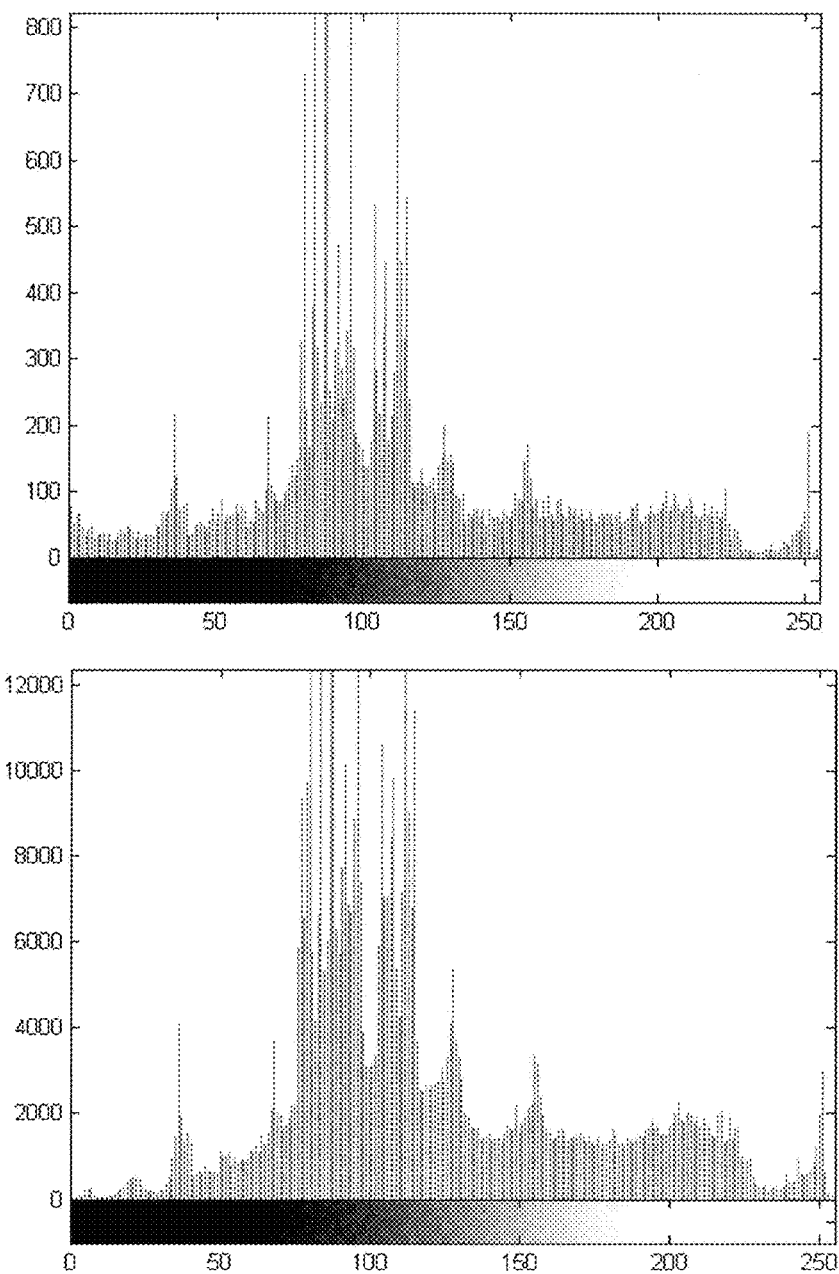
FIG. 10 is a histogram of an exemplary depth map before refinement and after refinement.

FIG. 10 shows the histograms of the depth map of the reference color image in FIG. 8 (a) before and after refinement. The unique depth values have not changed after refinement process.

Thus, the invention provides a novel depth estimation algorithm has been proposed. The proposed method is based on adaptive window patterns of Census transform which make it robust against illumination changes and suitable for applications like advanced driver assistance systems. By down-sampling the reference images, the computational complexity of the whole algorithm is reduced. A modified cross-based cost aggregation technique is proposed that generated cross-shape support regions for each pixel individually. The proposed depth refinement technique aims at filling the holes and sharpening the object boundaries. The background depth pixels are used in order to fill the holes of the estimated depth map and the proposed trilateral filter is used to enhance the quality of the depth map. Simulation results indicate that the proposed method fulfills the aims by improving the quality of the generated depth maps and reducing the computational complexity.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of determining depth in images, comprising:
generating an image mask indicating smooth areas and object edges for each of a pair of stereo images;
distinguishing between the smooth areas and the object edges as a function of pixel curvature;
aggregating curvature values over a predetermined window;
generating a curvature map for the each of a pair of stereo images; and
generating the image mask from the curvature map;
calculating a computation cost for a plurality of pixels within the image mask; and
matching pixels between the each of a pair of stereo images and optimizing a value for the matching pixels to obtain an estimated depth map.

2. The method of claim 1, further comprising reducing image resolution of each of the pair of stereo images.

3. The method of claim 1, further comprising calculating the computation cost using Census transform to map a pixel block into a bit stream.

4. The method of claim 3, further comprising applying a first Census window pattern for the smooth areas and a second Census window pattern for the object edges.

5. The method of claim 3, wherein the computational cost is calculated by finding a Hamming distance between obtained bit streams of corresponding pixels between the pair of stereo images.

6. The method of claim 3, further comprising aggregating cost over a predetermined size pixel window.

7. The method of claim 1, further comprising aggregating a cost of each of the pixels over a support region within the pair of stereo images.

8. The method of claim 1, further comprising refining the estimated depth map by filling holes in the estimated depth map by a weighted interpolation using a selected correct pixel.

9. The method of claim 1, further comprising refining the estimated depth map by sharpening edges and object boundaries by trilateral filtering.

10. The method of claim 1, further comprising:
creating an adaptive cross shape;
aggregating computation cost values within the created adaptive cross shape.

11. A method of determining depth in images, comprising:
generating an image mask indicating smooth areas and object edges for each of a pair of stereo images;
calculating a computation cost for a plurality of pixels within the image mask;
aggregating a cost of each of the pixels over a support region within the pair of stereo images;
creating an adaptive cross for each of the pixels;
determining a horizontal and vertical arm length for the adaptive cross;
aggregating cost values within the created adaptive cross; and
matching pixels between the each of a pair of stereo images and optimizing a value for the matching pixels to obtain an estimated depth map.

12. The method of claim 11, further comprising distinguishing between the smooth areas and the object edges as a function of pixel curvature.

13. The method of claim 12, further comprising:
aggregating curvature values over a predetermined window;
generating a curvature map for the each of a pair of stereo images; and
generating the image mask from the curvature map.

14. A method of determining depth in images, comprising:
reducing image resolution in each of a pair of stereo images;
creating an image mask as a function of pixel curvatures for each of the pair of stereo images;
determining a computational cost value for a plurality of pixels using a Census transform to map a local neighborhood surrounding each of the plurality of pixels to a bit stream;
aggregating cost values for each of the plurality of pixels; and
matching pixels between the pair of stereo images and optimizing a value for the matching pixels to obtain an estimated depth map;
wherein the aggregating cost values comprises:
creating an adaptive cross shape; and
aggregating cost values within the created adaptive cross shape.

15. The method of claim 14, further comprising distinguishing smooth areas and sharp edges in the each of the pair of stereo images as a function of pixel curvature.

16. The method of claim 15, further comprising:
aggregating the pixel curvature over a predetermined window size; and
selecting a Census window pattern as a function of pixel curvature within the predetermined window size.

17. The method of claim 14, wherein each of the cost values is calculated by finding a Hamming distance between corresponding bit streams of the pair of stereo images.

18. The method of claim 14, further comprising first adding the cost values horizontally across the adaptive cross shape to obtain horizontal cost values, and obtaining a final value by vertically adding the horizontal cost values.

19. The method of claim 14, further comprising refining the estimated depth map by filling holes in the estimated depth map by a weighted interpolation using a selected correct pixel.

20. The method of claim 19, further comprising refining the estimated depth map by sharpening edges and object boundaries by trilateral filtering.

* * * * *